US005394394A

United States Patent [19]
Crowther et al.

[11] Patent Number: 5,394,394
[45] Date of Patent: Feb. 28, 1995

[54] MESSAGE HEADER CLASSIFIER

[75] Inventors: William R. Crowther, Lincoln; Stanley A. Lackey, Jr., Groton; C. Philip Levin, Malden; Daniel C. Tappan, Boxboro, all of Mass.

[73] Assignee: Bolt Beranek and Newman Inc., Cambridge, Mass.

[21] Appl. No.: 81,646

[22] Filed: Jun. 24, 1993

[51] Int. Cl.[6] .......................... H04Q 11/04; H04J 3/24
[52] U.S. Cl. ....................................... 370/60; 370/94.1
[58] Field of Search ...................... 370/60, 94.1, 85.13, 370/58.1, 58.2, 61, 60.1

[56] References Cited

U.S. PATENT DOCUMENTS

| | | | |
|---|---|---|---|
| 4,933,937 | 6/1990 | Konishi | 370/85.13 |
| 5,136,580 | 8/1992 | Videlock et al. | 370/60 |
| 5,229,994 | 7/1993 | Balzano et al. | 370/85.13 |
| 5,237,564 | 8/1993 | Lespagnol et al. | 370/60 |
| 5,249,178 | 9/1993 | Karano et al. | 370/60 |

*Primary Examiner*—Douglas W. Olms
*Assistant Examiner*—Huy D. Vu
*Attorney, Agent, or Firm*—Henry D. Pahl, Jr.

[57] ABSTRACT

The classifier device disclosed herein analyzes message headers of the type which comprise a sequence of bit groups presented successively. The device employs a read/write memory for storing at a multiplicity of addresses, an alterable parse graph of instructions. The parse graph instructions include node instructions which comprise opcodes in association with respective next address characterizing data and terminator instructions which comprise identifying data for previously characterized header types. A logical processor responds to a node instruction read from memory either by initiating another memory read at a next address which, given the current state of the processor, is determinable from the current node instruction and the current header bit group or by outputting data indicating recognition failure if no next address is determinable. The logical processor responds to a terminator instruction by outputting respective header identifying data. Accordingly, for a previously characterized header type, a corresponding pattern of node instruction and a terminator instruction can be written into memory thereby enabling the device to identify the respective header type in a time which is essentially proportional to the length of the header and thus also to the time of presentation of the header. The parse graph can be updated dynamically during the operation of the classifier.

20 Claims, 4 Drawing Sheets

MESSAGE HEADER CLASSIFIER

MICROFICHE APPENDIX

The disclosure in this case includes a microfiche computer program listing comprising . . . microfiche and . . . frames. The listing is being initially submitted in printed form.

BACKGROUND OF THE INVENTION

The present invention relates generally to packet switched message handling systems and, more particularly, to a device for quickly classifying previously characterized message headers.

There is increasing interest in providing communications between disparate computer systems and even between networks of differing characteristics. Further, with the availability of very high bandwidth trunk lines, e.g., using fiber optic cables, there is increasing interest in combining traffic from a great variety of sources for transmission through a single trunk line. For wide area networks, packet switching technology is widely used where information to be transmitted is broken into packets of data which are proceeded by headers containing information useful in routing. The header may also identify the source and the destination. Whether truly packet switched or not, most digital communication systems employ message formats in which there is an identifying header of some sort.

For large and complex networks, one standard which is being adopted is that of an asynchronous transfer mode (ATM) switch which operates to transfer data cells of standard characteristics between links in a network. Within an ATM network, routing is typically provided by setting up a path between a source and destination and then including, in the headers for the standardized cells or packets, data which identifies that path to the various switches along the route. However, at various points, a relatively standardized ATM network must interface with disparate systems and convert the message formats of the disparate systems into the standard ATM cell format. A typical situation where this type of interfacing is necessary is at a so-called bridge where a ATM network interfaces with a local area network, e.g., an ethernet or a token ring network. The job of the bridge is essentially to examine all of the traffic on the local area network and, if the destination of a given packet is across the ATM network, i.e., outside the respective local area network, the bridge transfers that message into the ATM network. This process is often referred to as forwarding.

Heretofore, the analysis of message headers to determine appropriate action has been provided by writing a conventional computer program to run on a high speed, but essentially conventional, general purpose processor. The program operates to dissect and test the components of the message header and thereby determine its content. If such a generalized analysis process is performed on every arriving packet or message the time required for such processing rises rapidly as the number of possible header types increases and for high bandwidth systems it may be essentially impossible to conduct such processing. Further, the time required to analyze a message header using this approach, can be highly variable and unpredictable. It is therefor questionable whether this approach can be sufficiently refined to meet the demands of connecting high speed ATM networks to highly varied traffic sources.

Among the several objects of the present invention may be noted the provision of a novel device for classifying message headers of the type which comprises a sequence of bit groups presented successively; the provision of such a device which will direct selected messages to a selected one of a plurality of output paths in accordance with the contents of the message header; the provision of such a device which will classify a message header in a time essentially proportional to the length of that header; the provision of such a device which operates at high speed; the provision of such a device in which the time required to classify a header is predictable; the provision of such a device whose operation can be easily altered to accommodate new types of message headers; the provision of such a device which is highly reliable and which is of relatively simple and inexpensive construction. Other objects and features will be in part apparent and in part pointed out hereinafter.

SUMMARY OF THE INVENTION

The classifier apparatus of the present invention operates to classify messages in accordance with the contents of a message header which comprises a sequence of bit groups presented successively. The apparatus employs a memory for storing, at a multiplicity of addresses, node instructions which comprise opcodes in association with respective next address characterizing data and terminator instructions which comprise identifying data for respective header types. The apparatus also employs logic means responsive to a node instruction read from memory for initiating a memory read at a next address which, given the current state of the logic means, is determinable from only the current node instruction and the current header bit group or for outputting data indicating recognition failure if no next address is determinable. The logic means is responsive to a terminator instruction for outputting the respective header identifying data. Accordingly, the apparatus can be made to respond to a particular header type by writing a corresponding pattern of node instructions and a terminator instruction into the memory. Preferably, the logic means incorporates registers for storing its state during jumps to subroutines.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
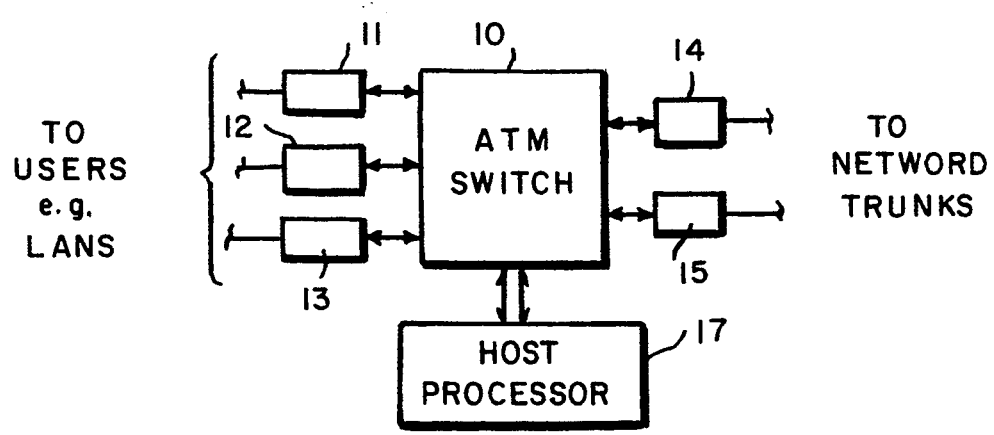
FIG. 1 is a block diagram of an ATM switch system employing a classifier in accordance with the present invention.

While the classifier apparatus of the present invention is not particularly concerned with the details of the network switching process or the conversion of disparate message formats into ATM cells, the following description is useful in setting the context within which the classifier apparatus operates and has utility. Referring now to FIG. 1, an ATM switch core is designated generally by reference character 10. Switch core 10 may be considered a generalized cross-bar type switch which uses packet switching techniques to transmit ATM cells from one to another of a set of line cards 11–15, the destination line cards being selected in accordance with data contained in the cell headers. The line cards 11–15 are of two general types. The line cards 11–13 are designated edge cards in the sense that they constitute the edge of the ATM network and provide for interfacing with user systems, e.g., local area networks or mainframe computers. The line cards 14 and 15 are designated as trunk cards and serve to interface between the switch 10 and the ATM trunks.

Overall operations of the ATM switch system are typically coordinated by a host computer as designated by reference character 17. Further, distributed control of component subsystems is implemented by microcomputers incorporated into the various sub-systems of the overall system. These local processors are referred to hereinafter as control processors and may, for example, be implemented by a thirty two bit microcomputers, e.g., of the Motorola 68040 type. Communications between the host computer 17 and these various control processors can be implemented by communications through the switch itself. In addition, certain hardware functions are implemented by means of dedicated micro-controllers incorporated into the subsystems. They are often referred to hereinafter as standard microcontrollers (SMC).

Figure 2:
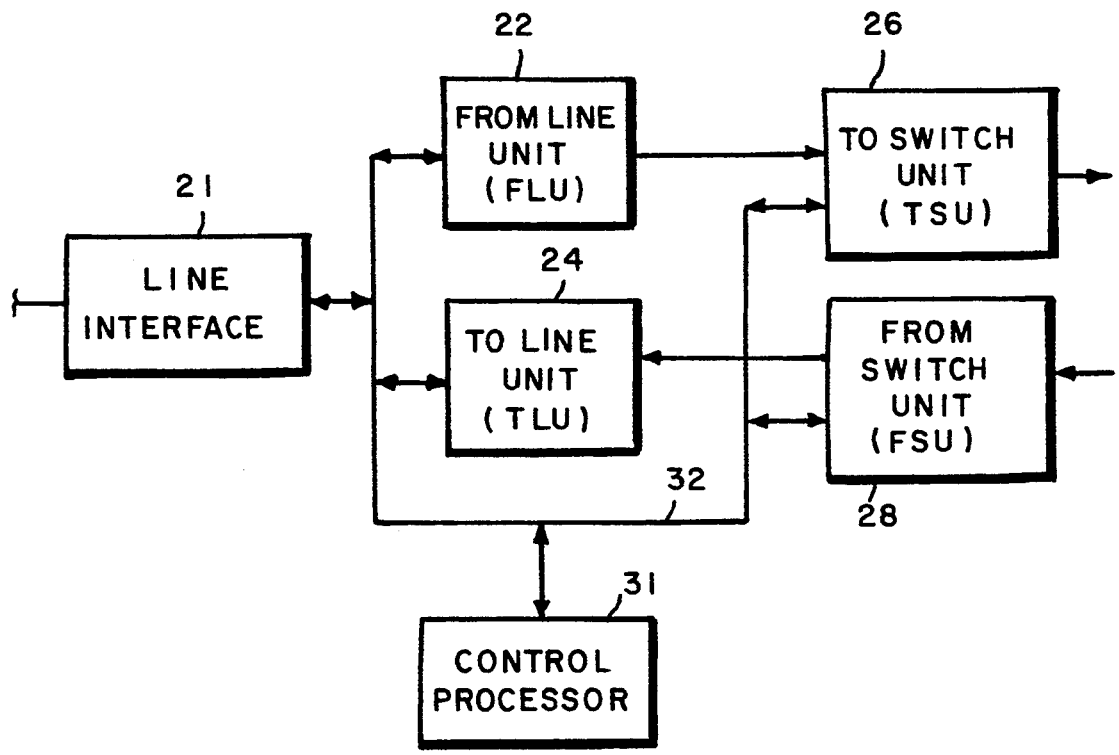
FIG. 2 is a block diagram of an edge card employed in the switch system of FIG. 1.

FIG. 2 is a block diagram illustrating the general functionality provided in one of the edge cards 11–13. Referring to FIG. 2, circuitry specific to interfacing to the particular type of external line is indicated generally by block 21. As will be understood, this circuitry will vary considerably from one type of line card to another depending upon the external system to be interfaced. The circuitry for handling the message traffic between the external line unit 21 and the ATM switch is conveniently divided into four sections: a From Line Unit (FLU) 22; a To Line Unit (TLU) 24; a To Switch Unit (TSU) 26; and a From Switch Unit (FSU) 28. The edge card includes a control processor 31 of the type described previously. Control processor 31 can read and load various registers and memory locations in the various hardware sections through a data bus 32.

As indicated previously, one of the functions provided is the conversion of external message formats to ATM cell formats and this functionality is provided in the edge cards and in particular in the From Line Unit 22. The From Line Unit 22 incorporates the recognizer or classifier of the present invention together with segmentation circuitry for converting line messages to ATM cells. If the classifier recognizes or can appropriately classify the header of an incoming packet, it provides to the segmentation circuitry a set of data which characterizes the message and enables the segmentation circuitry to convert the incoming message or packet into an appropriate number of ATM cells. The ATM cells are then coupled to the switch 10 through the To Switch Unit 26 which provides appropriate interfacing and buffering. Correspondingly, ATM cells arriving from the switch 10 are interfaced and buffered by the From Switch Unit 28. The ATM cells themselves carry the information necessary for reassembly into a message format appropriate for the particular type of local line being interfaced, this reassembly being performed in the To Line Unit 24. As indicated previously, the host computer 17 communicates with the various control processors through the switch itself. To enable this communication, the To Switch Unit 24 and the From Switch Unit 28 couple such communications to the edge card control processor 31 through bus 32.

Figure 3:
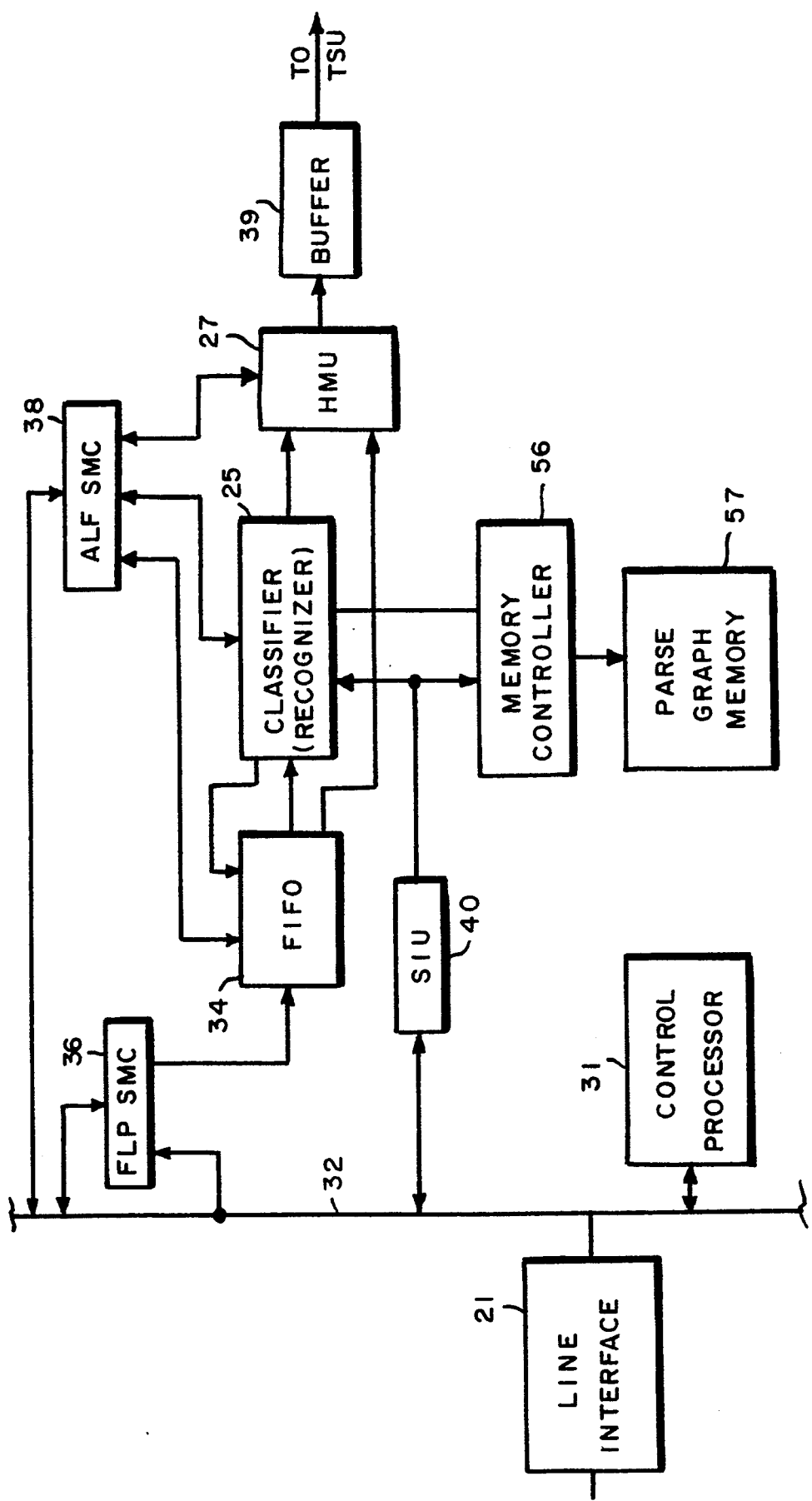
FIG. 3 is a block diagram of a from line unit employed in the edge card of FIG. 2

The From Line Unit is illustrated in greater detail in FIG. 3. Packets incoming from the local line interface 21 are transferred from the bus 32 to a FIFO register 34 under the control of one of the standard micro controllers, designated by reference character 36 and referred to hereinafter as the FLP-SMC. The contents of the FIFO 34 are provided to both a classifier 25 constructed in accordance with the present invention and to header processor and segmentation circuitry designated generally by reference character 27 and sometimes referred to hereinafter as a HMU (header manipulation unit). The operations of the FIFO 34, the classifier 25 and the header processor 27 are coordinated by another one of the standard microcontrollers, designated by reference character 38 and referred to hereinafter as the ALF-SMC. As indicated previously, if the classifier 25 can recognize a message header, characterizing data is provided to the ALF-SMC 38 which generates an appropriate ATM cell header. The ATM cell headers are then combined, in the circuitry 27, with appropriate sections of message data taken directly from the FIFO register 34. Output staging and buffering are provided as indicated at block 39 prior to coupling the formed ATM cells into the To Switch Unit 26. As also indicated previously, the classifier 25 utilized a parse graph memory in which instruction patterns identifying known message headers are written. This parse graph memory is designated by reference character 57 and is accessed by the classifier 25 through a memory controller 56.

By means of a slave interface unit 40 which interfaces between the bus 32 and the memory controller 56, the control processor 31 can write to memory 57, typically relaying parse graph patterns generated by the host processor 17.

The host processor sets up in memory 57 what may be conveniently described as a parse graph which allows the classifier to analyze headers in a manner which is not only fast in a general sense but also entails only a predictable time cost for any given header structure, that time being essentially proportional to the length of the header and thus proportional also to the time required for presentation of the header. The patterns stored in memory 57 may also be characterized as a directed acyclic graph.

Message headers are typically organized as a sequence of bit groups presented successively with the groupings being based on either four bit quantities, i.e., nybbles, or eight bit quantities, i.e., bytes. In the particular embodiment being described, message headers are analyzed four bits at a time. In general, information identifying a particular type of header is introduced by writing into the memory 57 a sequence of instructions which test the four bit data groups from the header successively though not necessarily in order and, based on the test results, cause a branch to a next instruction. In one sense, the recognition or classification operation may be thought of as decoding a path through the parse graph of instructions. It should be understood, however, that the paths for different headers may utilize some common segments, e.g., arising through similar bit patterns in the headers. As described in greater detail hereinafter, commonly used testing sequences can be advantageously constructed as a form of subroutine.

It should also be understood that it is not necessary that there be a one for one correspondence of instructions with the nybbles in the header since the instruction set allows for skips if the analysis already performed has provided a sufficient unique identification so that some or all further processing is unnecessary. For example, in the application of the ATM switch as a bridge, whole classes of messages may simply be of no interest to the ATM network. Thus, they can be effectively discarded as soon as it is known that the message falls within a class to be discarded. For this reason, the apparatus of the present invention is broadly defined as a classifier though it is often referred to as a recognizer. As also suggested earlier, it is not necessary that the bit groups be examined in order. It may be appropriate to defer examining some of the bit groups unit1 after a much later bit group in the header sequences has been examined. This out-of-order processing can be implemented using a skip instruction as defined in greater detail hereinafter.

While a read only memory could be used for the parse graph if all header patterns to be classified or recognized were preestablished, it is presently preferred that the memory 57 be implemented as a read/write memory so that the instruction sequences for classifying or recognizing the various header patterns can be updated as new headers are encountered and so that the instruction sequences for currently unused types of message headers can be stripped out of the memory. In decoding the parse graph, the classifier 25 does not write to this memory but only provides read addresses thereto. Words thusly read out from the memory are then provided back to the classifier which utilizes those words as instructions as described in greater detail hereinafter.

As described previously, messages obtained from the local line are buffered in FIFO 34. Four bits at a time (a nybble) are read into the classifier or recognizer engine 25. The recognizer engine 25 is a semi-autonomous machine that scans FIFO 20 looking for packet headers to parse. Once a header with the minimum number of bytes or nybble is found, the recognizer engine initializes itself and then parses until termination.

Figure 4:
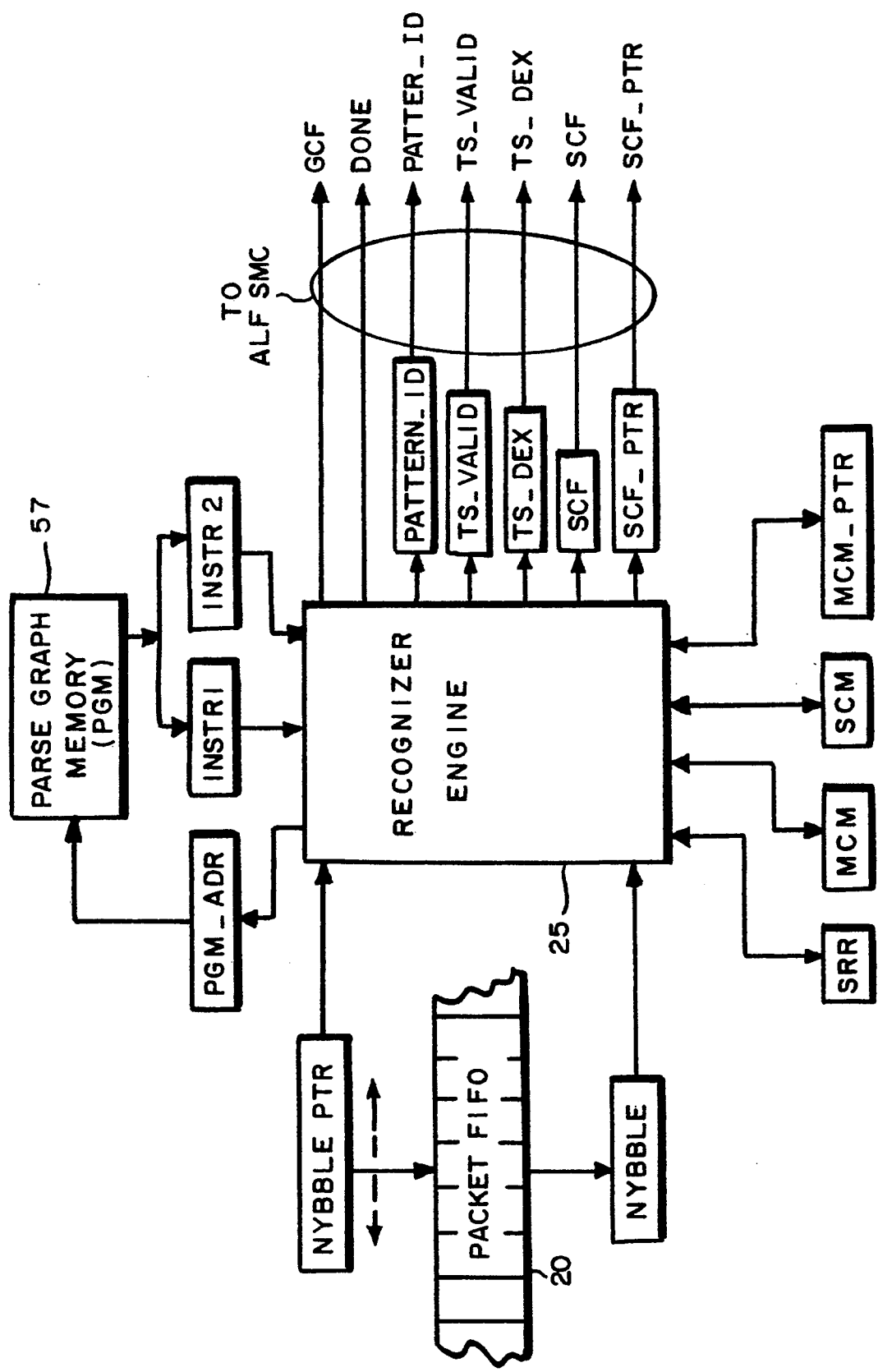
FIG. 4 is a diagram illustrating the interfacing of a classifier of the present invention with other components of the from line unit of FIG. 3.

While the detailed implementation of a classifier or recognizer engine in accordance with the present invention will depend to a great extent upon the details of the overall system within which it will operate, it is useful to explain a particular implementation by way of example. FIG. 4 illustrates in some greater detail the interfacing of the classifier or recognizer engine 25 with the other components shown in FIG. 3.

FIG. 4 shows various of the signals and register values which are used in the recognizer engine and which interact with the FIFO 20; the control microcomputer; and the parse graph memory 57. Certain of these signals, e.g., those having to do with time stamping, are not directly involved with the classifier operation and are not later referenced. In the particular embodiment being described, these signals and values are defined as follows:

nybble_ptr holds the packet FIFO address of the next nybble to by loaded into nybble. It points to the current nybble of the packet header on the part that the recognizer is parsing.

nybble is the value of the packet nybble currently addressed by nybble_ptr.

pgm_adr holds the next Parse Graph Memory (PGM) address to be accessed during recognition.

instr1 is the primary instruction register and holds the 32-bit content of the PGM node addressed by pgm_adr.

instr2 is the secondary instruction register and holds the 32-bit content of the second word of the optimized compare instruction (COMPARE_EQ_OP_2).

srr is loaded during a subroutine call (JSR) instruction and holds the base return address for subroutines. During a return-from-subroutine, srr, offset by a specified amount, is loaded into nxt_addr.

mcm is used by the Recognizer to indicate that the Modified Compare Mode is enabled. This is used to modify the Recognizer's reaction to a compare failure during parsing. mcm is enabled whenever a JSR instruction is executed.

scm is used by the Recognizer to indicate that the Source Compare Mode is enabled. The scm bit is enabled when the instr1[SCE.JSR] field is asserted during a JSR.

mcm_ptr is used during Modified Compare Mode to hold the value of nybble_ptr when a JSR is executed. The Recognizer can then use this value to reload nybble_ptr in the event of a compare failure during the subroutine.

scf_ptr is used during Source Compare Mode to capture the value of mcm_ptr when the Recognizer returns from a subroutine due to a comparison failure. This capture can only occur when Source Compare Mode is enabled.

scf indicates to the SMC that an Source Compare failure has occurred. If scf is asserted, scf_ptr holds the pointer to the beginning of the field that cause the compare failure.

ts_dex is the timestamp index used in aging to update the aging table. It's value is read by the SMC.

ts_valid indicates that the timestamp in tx_dex is valid and should be read by the SMC.

pattern_id holds the pattern ID of the packet after analysis by the Recognizer.

done indicates to the SMC that the Recognizer has terminated parsing.

gcf indicates to the SMC that a general comparison failure has occurred.

Packet FIFO is a nybble-addressable FIFO loaded with packet data from the line.

Parse Graph Memory holds all parse instructions. Its data port is 32 bits wide.

While the internal construction of the recognizer engine is described in greater detail hereinafter, it is initially useful to note that its overall operation is to perform a parsing algorithm. In general it may be noted that the parsing algorithm utilizes each instruction obtained from the parse graph memory, typically in conjunction with a nybble taken from the message header, in order to generate an address for the next instruction. The parsing algorithm can be described as follows:

```
/* initialize recognizer */
mcm = FALSE;                            // modified compare mode
scm = FALSE;                            // source compare mode
tsm = FALSE;                            // timestamp mode
scf = FALSE;                            // source compare failure flag
gcf = FALSE;                            // general compare failure
flag
ts_valid = FALSE;                       // timestamp invalid
nybble_ptr = value related to
  current port;                         // point to first parse nybble
nybble = fifo[nybble_ptr];              // get the first parse nybble
pgm_adr = value related to
  current port;                         // start the parse location
mcm_ptr = unknown;                      // don't make any assumptions
scf_ptr = unknown;                      // don't make any assumptions
srr = unknown;                          // don't make any assumptions
ts_dex = unknown;                       // don't make any assumptions
/* process instructions */
forever begin                           // continue until terminate
  instr = content of PGM at adr;        // get next instruction
  if (instr is a JSR) begin
    mcm = TRUE                          // enable modified compare
mode
    mcm_ptr = nybble_ptr;               // save in case of compare
                                        //   failure
    if (instr1[SCE] = = TRUE)           // source compare mode enabled
      scm = TRUE;
    if (instr1[TSE] = = TRUE)           // timestamp mode enabled
      tsm = TRUE;
    srr = instr1[NEXT];
    pgm_adr = instr1[NEXT];
  end
  else if (instr is an RTS) begin
    nxt_adr = srr[21:0] instr1[OFFSET]; // explicit return
    if (tsm = = TRUE)                   // is timestamping
                                        //   enabled?
      if (instr1[TS] = = TRUE) begin    // timestamping is
                                        //   requested
        ts_dex = instr1[INDEX];
        ts_valid = TRUE;                // alert ALF SMC
      end
  end
  else if (instr1 is compare_eq, compare_eq_op_1, compare_eq_op_2
    or range format)
    if (comparison failure occurs)
      process_compare_failure;
    else begin
      if (instr1 is compare_eq_op_1)
        pgm_adr = {pgm_adr[21:4], 4'b0001};
      else
        pgm_adr = instr1[NEXT];
    end
  else begin
    process other types of instructions
    pgm_adr = instr1[NEXT];
  end
end
```

This description is stated in a form of pseudo code which is similar to either the computer language C or the hardware description language known as Verilog.

From the foregoing it will be understood that the recognizer is in some sense a logic engine or processor. While a more detailed hardware description of the recognizer engine is given hereinafter and in the Microfiche Appendix, it should also be understood that such a processor can also be defined by its instruction set.

As indicated previously, the read/write memory 57 stores instruction words. These words are 32 bits wide and the arrangement of the fields of each instruction within those 32 bits is illustrated in a corresponding table in the following description. Each of the instructions occupies a single 32 bit word except for the Optimized Equality Check which uses two words from memory. In the description of each of the instructions there is both a verbal description of the operation performed as a result of executing that instruction and also a so-called pseudocode description of the microcoded operations performed by the logic means 53. As is understood by those skilled in the art, pseudocode is an efficient means for communicating the essential operation of a hardware device without becoming embroiled in detailed gate level analysis. The pseudocode examples given herein are essentially patterned after the standard Verilog hardware description language. The particular embodiment described herein implements the following instruction set.

Compare for Equality (COMPARE_EQ)

| FIELD  | POS   | LEN | DESCRIPTION                      |
|--------|-------|-----|----------------------------------|
| OPCODE | 31:30 | 2   | constant: 2'b01                  |
| VALUE  | 29:26 | 4   | compare value                    |
| MASK   | 25:22 | 4   | mask value for logical and operation |
| NEXT   | 21:00 | 22  | next node address for successful |

| FIELD | POS | LEN | DESCRIPTION |
|---|---|---|---|
| | | | comparison |

DESCRIPTION

This is the generalized compare instruction. The nybble is logically ANDed with MASK and the result is compared to VALUE. If the compare succeeds, control is transferred to NEXT, otherwise, process_compare_failure is called for further processing. Successful comparison causes nybble_ptr to be incremented by 1.

The COMPARE_EQ instruction can also be used to effect an explicit failure (FAIL) and thus cause assignment of a divert_id as the pattern ID. This is done by letting: MASK=4'b0000 and VALUE be any non-zero value. A compare failure will always result.

COMPUTATION

```
instr1 = COMPARE_EQ:
nybble = fifo[nybble_ptr];
if ((MASK & nybble) == instr1[VALUE]) begin
    pgm_adr = instr1[NEXT];
    nybble_ptr = nybble_ptr + 1;
end
else
    process_compare_failure;
```

Optimized Compare (COMPARE_EQ_OP_1, COMPARE_EQ_OP_2)

| FIELD | POS | LEN | DESCRIPTION |
|---|---|---|---|
| OPCODE | 31:29 | 3 | constant: 3'b111 |
| SPARE | 28:27 | 2 | constant:2'b00 |
| NUM | 26:24 | 3 | number of nybbles to check − 1 (legal range:<1 NUM<=7) |
| N0 | 23:20 | 4 | comparison value |
| N1 | 19:16 | 4 | comparison value |
| N2 | 15:12 | 4 | comparison value |
| N3 | 11:08 | 4 | comparison value |
| N4 | 07:04 | 4 | comparison value |
| N5 | 03:00 | 4 | comparison value |

| FIELD | POS | LEN | DESCRIPTION |
|---|---|---|---|
| OPCODE | 31:30 | 2 | constant: 2'b00 |
| N6 | 29:26 | 4 | comparison value |
| N7 | 25:22 | 4 | comparison value |
| NEXT | 21:00 | 22 | next node address for successful comparison |

The COMPARE_EQ_OP_1 instruction word must appear on an even address. The COMPARE_EQ_OP_2 instruction must be in the word address immediately following the compare_eq_op_1 instruction. The COMPARE_EQ_OP_1 and COMPARE_EQ_OP_2 instructions must always appear together, even if the number of comparisons is less than 6. In this case, COMPARE_EQ_OP_2 will be used only to obtain the next node address in the case of successful comparison.

DESCRIPTION

This is a space optimized compare-for-equality instruction. A specified number (NUM+1) of nybbles are compared with as many as eight values (n0-n7). if the compare succeeds, control is transferred to NEXT, otherwise, process_compare_failure is called for further processing. No masking is allowed before comparison. Successful comparison over all nybbles advances nybble_ptr by NUM +1.

```
instr1 = COMPARE_EQ_OP_1;
instr2 = COMPARE_EQ_OP_2;
nybble = fifo[nybble_ptr];
for (count=0; count<=num; count-count+1) begin
    case (count) begin
        0 :if (nybble == instr1[N0])
            pgm_adr = instr2[NEXT];
        else
            process_compare failure;
        1 :if (nybble == instr1 [N1])
            pgm_adr = instr2[NEXT];
        else
            process_compare_failure;
        2 :if (nybble == instr1 [N2])
            pgm_adr = instr2[NEXT];
        else
            process_compare_failure;
        3 :if (nybble == instr1 [N3])
            pgm_adr = instr2[NEXT];
        else
            process_compare_failure;
        4 :if (nybble == instr1 [N4])
            pgm_adr = instr2[NEXT];
        else
            process_compare_failure;
        5 :if (nybble == instr1 [N5])
            pgm_adr = instr2[NEXT];
        else
            process_compare_failure;
        6 :if (nybble == instr2 [N6])
            pgm_adr = instr2[NEXT];
        else
            process_compare_failure;
        7 :if (nybble == instr2 [N7])
            pgm_adr = instr2[NEXT];
        else
            process_compare_failure;
    endcase
    nybble_ptr = nybble_ptr + 1;
end
```

Range Testing (RANGE)

| FIELD | POS | LEN | DESCRIPTION |
|---|---|---|---|
| OPCODE | 31:28 | 4 | constant: 4'b0000 |
| TYPE | 27 | 1 | testing type: LTE (type = 1'b0), GTE (type = 1'b1) |
| FIRST | 26 | 1 | nybble is first of compare word: 1'b1, else first = 1'b1 |
| VALUE | 25:22 | 4 | compare value |
| NEXT | 21:00 | 22 | next node address for successful comparison |

DESCRIPTION

This is the range test instruction. It determines of a field in the header is either greater-than-or-equal-to or less-than-or-equal-to the compare value VALUE. "Big-endian" values are assumed when comparing strings greater than one nybble in length. A satisfied bit, maintained by the Recognizer, is used to reminder that the inequality of strictly greater/less than has been achieved, and thus no more comparisons are necessary on remaining nybbles. The FIRST field should be set (TRUE) only during comparison of the first nybble in the string of interest. If the compare succeeds, control is transferred to NEXT, otherwise, process-compare-failure is called for further processing. Successful comparison advances nybble_ptr by 1.

COMPUTATION

```
instr1 = RANGE instruction format;
if (instr1[FIRST] == TRUE) begin
   satisfied = FALSE;
end
if (!satisfied)
   if (nybble == instr1 [VALUE])
      pgm_adr = instr1[NEXT];
   else if (instr1[TYPE] == 1'b1)        // test for > =
      if (nybble > instr1[VALUE])
         satisfied = TRUE;
         pgm_adr = instr1[NEXT];
      end
      else
         process_compare_failure
   else                                   // test for < =
      if (nybble < VALUE) begin
         satisfied = TRUE;
         pgm_adr = instr1[NEXT];
      end
      else
         process_compare_failure;
      pgm_adr = instr1[NEXT];
      nybble_ptr = nybble_ptr + 1;
```

Skip Nybbles (SKIP)

| FIELD | POS | LEN | DESCRIPTION |
|---|---|---|---|
| OPCODE | 31:28 | 4 | constant: 4'b0010 |
| NUM | 27:22 | 6 | number of nybbles to skip (2's-complement) |
| NEXT | 21:00 | 22 | next node address after skip |

DESCRIPTION

Skip NUM nybbles in the packet header. The num field is a 2's-complement value such that the skip range is: −32 to +31. Note that "SKIP 0" is a no-op.

COMPUTATION instr1 = SKIP instruction format;
nybble_ptr = nybble_ptr + instr1[NUM]; // 2's complement addition

Jump (JMP)

| FIELD | POS | LEN | DESCRIPTION |
|---|---|---|---|
| OPCODE | 31:25 | 7 | constant: 7'b0011000 |
| NUM | 24:22 | 3 | constant: 3'b000 |
| NEXT | 21:00 | 22 | next node address for transfer |

DESCRIPTION

Cause an unconditional transfer of control. Parsing continues at the node specified byn nxt_mode. This operation does not alter nybble_ptr.

COMPUTATION instr1 = JMP instruction format;
pgm_adr = instr1[NEXT];

Jump to Subroutine (JSR)

| FIELD | POS | LEN | DESCRIPTION |
|---|---|---|---|
| OPCODE | 31:25 | 7 | constant: 7'b00111001 |
| SCE | 24 | 1 | source compare enable |
| TSE | 23 | 1 | timestamp enable |
| SPARE | 22 | 1 | constant: 1'b0 |
| NEXT | 21:00 | 22 | next node address for transfer |

DESCRIPTION

Jump to subroutine. Parsing continues at the node specified by NEXT. The value of NEXT is saved in srr. The SCE field enables Source Compare Mode and TSE enables Timestamp Mode. Only a single level of subroutine is supported. This operation does not alter nybble_ptr.

COMPUTATION

```
instr1 = JSR instruction format;
   mcm = TRUE;                       // enable modified compare mode
   mcm_ptr = nybble_ptr;             // save in case of compare failure
   if (instr1[SCE] == TRUE)          // source compare mode enabled
      scm = 1;
   if (instr1[TSE] == TRUE)          // timestamp mode enabled
      tsm = 1
   srr = instr1[NEXT];
   pgm_adr = instr1[NEXT];
```

Case (CASE)

| FIELD | POS | LEN | DESCRIPTION |
|---|---|---|---|
| OPCODE | 31:29 | 7 | constant: 3'b110 |
| SPARE | 28:22 | 3 | constant: 7'b0000000 |
| NEXT | 21:00 | 22 | next node address for transfer |

DESCRIPTION

This performs a 16-way case branch by taking the next nybble from the header and logically ORing it with the low 4 bits of NEXT field, thus effecting up to a 16-way branch. This instruction increments nybble_ptr by 1.

COMPUTATION instr1 = CASE instruction format;
nxt_addr = [18'b0, nybble] instr1[NEXT];
nybble_ptr = nybble_ptr + 1;

Return from Subroutine (RTS)

| FIELD | POS | LEN | DESCRIPTION |
|---|---|---|---|
| OPCODE | 31:25 | 4 | constant: 7'b1011011 |
| SPARE | 24 | 1 | constant: 1'b0 |
| TS | 23 | 1 | timestamp request |
| SPARE | 22:21 | 2 | constant: 2'b00 |
| INDEX | 20:04 | 17 | index into Timestamp table (valid only when TS == 1) |
| OFFSET | 3:0 | 4 | return address offset |

DESCRIPTION

Return from subroutine with side-effect. The next node address in the upper 18 bits of srr concatenated with the 4-bit value in OFFSET. If TS is asserted, INDEX is loaded into tx dex. This operation increments nybble_ptr by 1.

COMPUTATION

```
instr1 = RTS instruction format;
nybble_ptr = nybble_ptr + 1;
next_addr = {srr[21:4], instr1[OFFSET]};?? explicit return
if (instr1[TS] == TRE)
    if (tsm == TRUE)                    // is timestamping enabled?
        ts_dex = instr1[INDEX]
        ts_valid = TRUE;                // alert ALF SMC
    end
```

Done (DONE)

| FIELD  | POS   | LEN | DESCRIPTION          |
|--------|-------|-----|----------------------|
| OPCODE | 31:25 | 7   | constant: 7'b0011100 |
| SPARE  | 24:20 | 5   | constant: 5'b00000   |
| PID    | 19:00 | 20  | packet Pattern ID    |

DESCRIPTION

Terminate header parsing operation. This packet's Pattern ID is in PID. The value of nybble_ptr is no longer significant after executing this instruction.

COMPUTATION

```
instr1 = DONE instruction format;
pattern_id = instr1[PID];
nybble+ptr = unknown;
terminate;
```

Some of the instruction set pseudo-code described in this section uses a prcess_compare_failure task to handle compare failures during comparison instructions. That task is shown in FIG. 4-1.

```
task process_compare_failure;
if (mcm == TRUE) begin           // modified compare mode
    mcm = FALSE;                 // reset for return
    pgm_adr = ret adr[21:41]  4'b0001;  // implicit return
    nybble_ptr = mcm=ptr];       // point to beginning of
field
    nybble = fifo[nybble_ptr];   // get next to nybble
    if (scm == TRUE) begin       // handle source compare
mode
        scr_ptr = mcm_ptr;       // save for ALF SMC
        scr = TRUE;              // alert ALF SMC
    end
end
else begin                       // this is a termination
fail
    gfc = TRUE;                  // set general failure
flag
    terminate:
end
endtask
```

Figure 5:
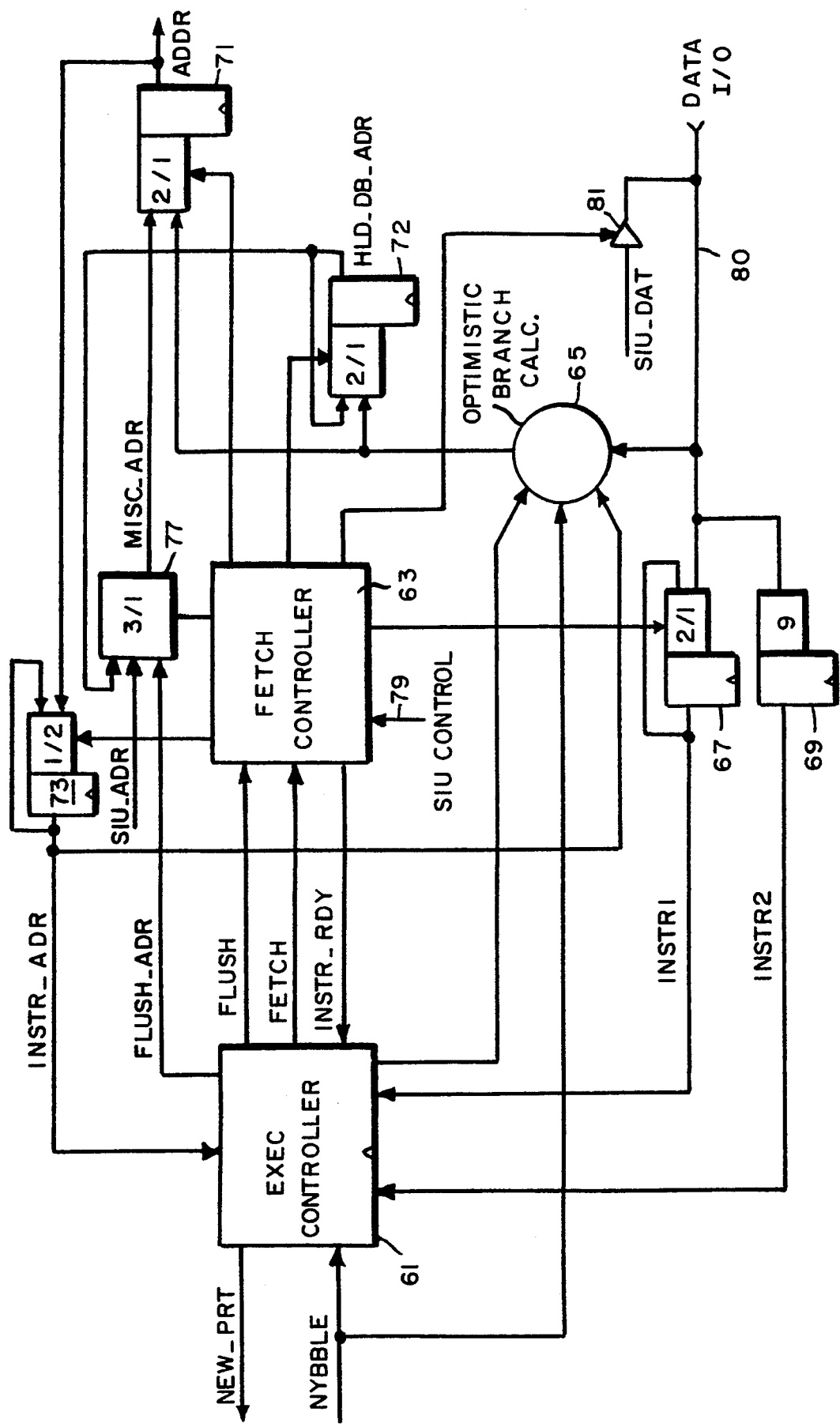
FIG. 5 is a data path diagram illustrating a classifier of the present invention as employed in the from line unit of FIG. 3.

A particular implementation of the recognizer engine and memory controller is illustrated in FIG. 5. This implementation is organized in three major logical units together with various latches and multiplexers. The three major logical units are an execution controller 61, a fetch controller 63 and an optimistic branch calculator 65. The execution controller and the fetch controller are implemented as finite state machines while the optimistic branch calculator is implemented as combinatorial logic. In addition to the overall functional description which follows, there is included with this application as a Mirofiche Appendix, a listing in the Verilog hardware descriptor language for each of these logical units. As is understood by those skilled in the art the Verilog language defines the digital logic in a manner which facilitates the generation of application specific integrated circuits (ASICS) which will implement the desired logical functions. The following listings are included in the appendix.

rec exec.v Describes the execution unit
rec fetch.v Describes the fetch unit
rec. v Recognizer module (calls rec_exec.v and rec fetch.v
optimistic.v Describes the optimistic branch calculator
rec_opcodes.v File included in rec_exec.v and rec_filter.v As suggested by its name, the function of the fetch controller 63 is essentially to interface with the parse graph memory 57, presenting addresses to it and receiving back words of data representing parse graph instructions. The principal function of the execution controller 61 in turn is to analyze the instructions fetched, to read in corresponding nybbles from the FIFO, and to perform the comparisons called for by the various instructions.

While the execution unit generates definitive addresses resulting from the execution of instructions, the fetch controller initiates fetch operations based on an optimistic assumption, i.e., that a needed comparison will succeed. The function of the optimistic branch calculator 65 is to determine such next instruction addresses proceeding on the assumption that the comparison will succeed.

Words read out of the parse graph memory are provided to the input designated by reference character 80, and are, in turn, provided directly to the optimistic branch calculator 65 and, through latches 67 and 69, to the execution controller 61. Two latches are provided since one instruction comprises two memory words as described previously. Since the most commonly encountered instruction types in the parse graph memory will be ones which merely designate a new node instruction address if a compare succeeds, the function of the optimistic branch calculator is merely to provide the 22 bits of the instruction to the memory address latch 71 as the next node address to be read. Fetch addresses initiated in this fashion are directly coupled to the address register 71.

As indicated previously, the optimistic branch calculator 65 does not actually perform the compare which must succeed if the address is to be valid. Accordingly, provision for effectively flushing this read operation is implemented. The actual comparing is performed by the execution controller 61 which utilizes the last instruction read together with the corresponding nybble taken from the input FIFO. In other words, the execution controller 61 more completely analyzes the last read instruction in conjunction with a nybble being obtained from the input FIFO and correctly determines the appropriate action to be taken to execute the actual instruction. The address previously generated by the optimistic branch calculator 65 is provided back to the executive controller 61 through a latch 73.

If the executive controller 61 determines that the memory read previously initiated by the optimistic branch calculator 65 is inappropriate, it can signal to the fetch controller that the previous operation should be flushed and can provide a flush address to the memory address latch 71 through a 3 to 1 multiplexer 77. Multiplexer 77 also allows the memory address latch 71 to be loaded with an address provided by the control processor 31 through the slave interface unit (SIU). The SIU also allows the control processor 31 to reset the fetch controller as indicated at 79. In addition, acting through the slave interface unit, the host computer 17 and control processor 31 can load the parse graph memory 57 through gates 81 which can drive the memory data lines for a write operation.

The parse graph instructions in general comprise two different types. The first of these may be referred to a node instruction. The logic means or recognizer engine responds to such node instructions by initiating a memory read at a next address in the parse graph memory 57 which, given the state of the recognizer, is determinable from only the current node instruction and the current header bit group. For each of these node instructions there is also a default condition which indicates that recognition has failed and, upon this condition, the logic means 25 generates output signals or data which communicates that fact to the ALF-SMC. In effect this means that the message header is of a new type which has not previously been characterized and for which no corresponding instruction pattern has been set up in the parse graph memory.

The second type of instruction is a termination instruction. Encountering a termination instruction in the processing of the message header means that the header has been successfully classified or recognized so that no further processing is needed. Each termination instruction includes a pattern ID which identifies the corresponding previously characterized message header and associates it with a path through the ATM network. As indicated previously, the ALF-SMC 38 utilizes this pattern ID to control the header management and segmentation circuitry 27 to convert the incoming local message into a sequence of ATM cells which can proceed through the ATM network and then be reassembled at the interface with the destination device or local area network. The controlling data provided by the logic means or classifier 25 to the ALF-SMC may also simply tell that device to discard the message since one of the operations of the classifier may be to use instruction patterns in the parse graph memory 57 which cause messages to not be accepted into the ATM network, e.g., when functioning as a bridge or filter as described previously.

Typically, the operation of the ALF-SMC in response to a recognition failure will be to signal to the control processor 31 and/or the host computer 17 to cause it to execute a more conventional program for analyzing the message header to determine if the message is one being of any interest of the ATM system. If it is of interest, the control processor can then write a corresponding pattern of instructions into the read/-write memory 57 so that, from then on, the message header will be recognized or classified by the logic means 53 and memory 57 without involvement of the host computer. As will be understood from the foregoing description, the added instructions will end with a termination instruction incorporating an appropriate pattern ID to enable the ALF-SMC to either appropriately convert or discard the message.

As will be understood by those skilled in the art a session of communications between a given source and destination will typically involve a large number of messages or packets. Accordingly, the great majority of messages which must be considered will be those previously characterized in the sense that corresponding sequences of instruction have been written into the memory 57. Thus, only new header types will have to incur the time penalty of a fully general analysis by the host computer 17. Further, since there is a correspondence between the number of instructions which need to be executed with the length of the message header, it will be understood that the maximum time required to recognize or classify a header is roughly proportional to the length of a header and thus also the time required to present it sequentially.

In addition to using the pattern ID information to control header conversion and segmentation, the ALF-SMC 38 also provides this data to the control processor 31. The control processor 31 utilizes this information to maintain a table of how recently each type of message header has appeared. Using this information the control processor can then remove from the read/write memory 57 those sequences of instructions which are no longer needed, thus freeing up memory for the introduction of new instruction sequences when it is necessary to accommodate new message headers. In general it may be noted that the classifying scheme implemented by the present invention is relatively undemanding of processor speed but consumes a relatively large amount of memory.

As indicated previously, some common testing procedures are advantageously conducted using a form of subroutine in the parse graph. Subroutines can be entered by a Jump to Subroutine (JSR) instruction, a definition of which was given earlier. As will be noted from the explicit definition of the JSR instruction certain information regarding the state of the recognizer logic is stored on execution of this instruction, which information is utilized in returning from the subroutine. Thus in the case of subroutines, the calculation of the next address in the parse graph memory may depend upon the stored state of the classifier logic as we all upon the current instruction and the nybble being read from the FIFO register. Return from subroutine is accomplished by the RTS instruction, also explicitly defined previously. The RTS instruction is somewhat unusual in that is allows the return to occur with an address offset. Accordingly, a subroutine can be structured with several RTS instructions with different offsets so that the point of return can be varied as a function of determinations made during the subroutine.

As will be understood by those skilled in the art, it will not always be appropriate to terminate parsing and discard and incoming message just because the header is not completely recognized. For example, if the destination can be recognized, it may be appropriate to forward the message through the network while at the same time alerting the control computer and/or the host computer that the message originated from an unrecognized source. The Jump to Subroutine (JSR) instruction implements this capability by putting the recognizer into a modified compare mode by setting the mcm bit. When this bit is set, a comparison failure does not automatically initiate a termination of parsing and 2 signaling of the ALF-SMC that a failure has occurred. Rather, parsing is continued and the decision to signal the ALF-SMC is deferred until the return from the subroutine.

The JSR instruction also provides for entering a mode known as source compare mode. When the source compare enable (sce) bit is set in the JSR instruction, the results of the modified compare mode are saved for later use by the ALC-SMC. Specifically, if a compare failure occurs when the modified compare mode is in effect, i.e., during a subroutine, the pointer (mcm_ptr) which identifies the instant header nybble is loaded into the source compare failure pointer (scf_ptr) and the source compare failure status bit SCF is asserted. Thus, at the end of parsing, the ALF-SMC can be informed of the particular nybble within the header which caused the source compare failure. As will be understood by those skilled in the art, the inclusion of these subroutine facilities and in particular the implementation of modified compare mode and source compare mode add flexibility to a system which is inherently quite fast as described previously.

In view of the foregoing it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. In a device for directing selected messages to a selected one of a plurality of output paths in accordance with the contents of a message header which comprises a sequence of bit groups presented successively, apparatus for quickly classifying headers; said apparatus comprising:
   a memory;
   stored in said memory, at a multiplicity of addresses, node instructions which comprise opcodes in association with respective next address characterizing data and terminator instructions which comprise identifying data for different header types;
   means for reading a selected one of said bit groups from the header of a message being received; and
   logic means responsive to a node instruction read from memory for initiating a memory read at a next address determinable from the current node instruction just read from memory and a header bit group obtained by said reading means, said logic means being responsive to a terminator instruction read from said memory for outputting respective header identifying data
   whereby, for each header type to be classified, a corresponding pattern of node instructions and a terminator instruction can be written into said memory, thereby enabling said apparatus to identify the respective header.

2. Apparatus as set forth in claim 1 wherein neither said node instruction nor said terminator instructions cause writing of data into said memory.

3. Apparatus as set forth in claim 1 wherein said logic means does not write data to said memory.

4. In a device for directing selected messages to a selected one of a plurality of output paths in accordance with the contents of a message header which comprises a sequence of bit groups presented successively, apparatus for quickly classifying headers; said apparatus comprising:
   a memory;
   stored in said memory, at a multiplicity of addresses, node instructions which comprise opcodes in association with respective next address characterizing data and terminator instructions which comprise identifying data for different header types;
   means for reading a selected one of said bit groups from the header of a message being received; and
   logic means responsive to a node instruction read from memory for initiating a memory read at a next address which, given the current state of the logic means, is determinable from only the current node instruction just read from memory and a header bit group obtained by said reading means, said logic means being responsive to a terminator instruction read from said memory for outputting respective header identifying data
   whereby, for each header type to be classified, a corresponding pattern of node instructions and a terminator instruction can be written into said memory, thereby enabling said apparatus to identify the respective header.

5. Apparatus as set forth in claim 4 wherein said node instructions include a jump to subroutine instruction which causes a memory read at a next address determinable from the instruction and wherein said logic means includes a register for retaining data identifying the address of the jump to subroutine instruction.

6. Apparatus as set forth in claim 5 wherein said node instructions include a return from subroutine instruction which causes a memory read at a next address which is offset from the address of the jump to subroutine instruction by a preselectable offset.

7. In a packet switched device for directing selected digital messages to a selected one of a plurality of output paths in accordance with the contents of a message header which comprises a sequence of bit groups presented successively, apparatus for quickly classifying previously characterized headers; said apparatus comprising:
   a memory;
   stored in said memory, at a multiplicity of addresses, node instructions which comprise opcodes in association with respective next address characterizing data and terminator instructions which comprise identifying data for previously characterized header types;
   means for reading a selected one of said bit groups from the header of a message being received; and
   logic means responsive to a node instruction read from memory for initiating a memory read at a next address which, given the current state of the logic means, is determinable from only the current node instruction just read from memory and a header bit group obtained by said reading means or for outputting data indicating recognition failure if no next address is determinable, said logic means being responsive to a terminator instruction read from said memory for outputting the respective header identifying data
   whereby, for each previously characterized header type to be classified, a corresponding pattern of node instructions and a terminator instruction can be written into said memory, thereby enabling said apparatus to identify the respective header.

8. Apparatus as set forth in claim 4 wherein said node instructions include a jump to subroutine instruction which causes a memory read at a next address determinable from the instruction and wherein said logic means includes a register for retaining data identifying the address of the jump to subroutine instruction.

9. Apparatus as set forth in claim 8 wherein said jump to subroutine instruction inhibits output of recognition failure data.

10. Apparatus as set forth in claim 8 wherein said node instructions include a return from subroutine instruction which causes a memory read at a next address which is offset from the address of the jump to subroutine instruction by a preselectable offset.

11. Apparatus as set forth in claim 7 wherein said node instructions include a compare for equality instruction which first masks a header bit group with a preselected mask value and generates a next instruction address if a match is obtained with a preselected compare value.

12. Apparatus as set forth in claim 7 wherein said node instructions include a multiple compare instruction in which a succession of header bit groups are compared with respective mask values and a next instruction address is generated if all matches are obtained.

13. Apparatus as set forth in claim 7 wherein said node instructions include a range instruction which generates a next instruction address if a header bit group falls within a given range of values.

14. Apparatus as set forth in claim 7 wherein said node instructions includes a case instruction which generates a next instruction address which is a function of the value of the current header bit group.

15. Apparatus as set forth in claim 14 wherein said case instruction includes a value which is logically ORed with the current header bit group.

16. In a device for selecting digital messages for further processing in accordance with the contents of a message header which comprises a sequence of bit groups presented successively, apparatus for quickly classifying previously characterized headers; said apparatus comprising:

a register for storing a plurality of said bit groups;
a memory;.
stored in said memory, at a multiplicity of addresses, node instructions which comprise opcodes in association with respective next address characterizing data and terminator instructions which comprise identifying data for previously characterized header types;

logic means which reads bit groups from said register and which reads node and terminator instructions from said memory and is responsive to a node instruction read from memory for initiating a memory read at a next address which, given the current state of the logic means, is determinable from only the node instruction just read from memory and the header bit group just read from said register, said logic means being responsive to a terminator instruction read from said memory for outputting the respective header identifying data whereby, for each header type to be classified, a corresponding pattern of node instructions and a terminator instruction can be written into said memory, thereby enabling said apparatus to output the respective header identifying data.

17. Apparatus as set forth in claim 16 wherein said node instructions include a skip instruction which cause said logic means to pass by a selected number of said bit groups in reading from said register.

18. Apparatus as set forth in claim 16 wherein said node instructions include jump instructions which generate next address values independently of bit group values.

19. Apparatus as set forth in claim 16 wherein neither said node instruction nor said terminator instructions cause writing of data into said memory.

20. Apparatus as set forth in claim 16 wherein said logic means does not write data to said memory.

* * * * *